US012166636B1

(12) United States Patent
Kotvis et al.

(10) Patent No.: US 12,166,636 B1
(45) Date of Patent: Dec. 10, 2024

(54) NETWORK PROTOCOL-BASED INTERROGATION FOR NETWORK DEVICE CHARACTERIZATION

(71) Applicant: Insight Direct USA, Inc., Chandler, AZ (US)

(72) Inventors: Benjamin Kotvis, Sussex, WI (US); David Allen Buckner, Eden Prairie, MN (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/470,854

(22) Filed: Sep. 20, 2023

(51) Int. Cl.
*H04L 41/0894* (2022.01)
*H04L 9/40* (2022.01)
*H04L 41/0853* (2022.01)

(52) U.S. Cl.
CPC ...... *H04L 41/0894* (2022.05); *H04L 41/0853* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 5,956,719 A | 9/1999 | Kudo et al. | |
| 5,987,575 A | 11/1999 | Yamaguchi | |
| 6,130,892 A | 10/2000 | Short et al. | |
| 6,360,255 B1 | 3/2002 | McCormack et al. | |
| 6,426,947 B1 | 7/2002 | Banker et al. | |
| 6,438,563 B1 | 8/2002 | Kawagoe | |
| 6,466,583 B1 | 10/2002 | Laraqui | |
| 6,643,657 B1 | 11/2003 | Baird et al. | |
| 6,754,703 B1 | 6/2004 | Spring | |
| 6,992,985 B1 | 1/2006 | Das | |
| 7,472,177 B2 | 12/2008 | Bose | |
| 7,653,709 B1 | 1/2010 | Miakinen | |
| 7,668,943 B2 | 2/2010 | Liu | |

(Continued)

FOREIGN PATENT DOCUMENTS

| CA | 2332023 A1 | 9/1999 |
|---|---|---|
| CN | 109710693 A | 5/2019 |

(Continued)

*Primary Examiner* — Caroline H Jahnige
(74) *Attorney, Agent, or Firm* — Kinney & Lange, P.A.

(57) ABSTRACT

A method of automated network documentation includes receiving a first network address for a first device connected to a local network, sending a first simple network management protocol (SNMP) request to the first network address for the first device, receiving a first SNMP response from the first device in response to the first SNMP request, and extracting first device identity information from the first SNMP request. The first network address is received by, the first SNMP request is sent by, the first SNMP response is received by, and the device identity information is extracted by a server configured to operate a network documentation platform, the network documentation platform comprising a network documentation database. The method further includes providing the first device identity information to the network documentation platform and modifying the network documentation database to create first device documentation data based on the first device identity information.

19 Claims, 2 Drawing Sheets

(56) References Cited

U.S. PATENT DOCUMENTS

| | | |
|---|---|---|
| 7,689,565 B1 | 3/2010 | Gandhi et al. |
| 7,711,816 B2 | 5/2010 | Liu et al. |
| 8,005,932 B2 | 8/2011 | Knees et al. |
| 8,407,328 B2 | 3/2013 | Kellagher et al. |
| 8,565,119 B2 * | 10/2013 | August ............... H04L 41/5058 370/254 |
| 8,683,032 B2 | 3/2014 | Spinelli et al. |
| 8,972,561 B1 | 3/2015 | Levesque et al. |
| 9,077,611 B2 | 7/2015 | Cordray et al. |
| 9,191,268 B2 | 11/2015 | Walden |
| 9,270,533 B2 | 2/2016 | Krishna |
| 9,716,718 B2 | 7/2017 | Belton et al. |
| 9,742,639 B1 * | 8/2017 | Zhang ..................... H04L 41/12 |
| 9,973,582 B2 | 5/2018 | Carricarte et al. |
| 10,044,566 B1 | 8/2018 | Grisco et al. |
| 10,341,841 B2 | 7/2019 | Owen et al. |
| 10,616,066 B2 | 4/2020 | Hale |
| 10,686,667 B1 | 6/2020 | Subramaniam |
| 10,693,727 B2 | 6/2020 | Zimmermann et al. |
| 10,754,406 B1 | 8/2020 | Gibson |
| 10,795,864 B1 | 10/2020 | Carricarte et al. |
| 2003/0097438 A1 * | 5/2003 | Bearden ............... H04M 3/2236 709/224 |
| 2003/0229686 A1 | 12/2003 | Kortright |
| 2004/0193462 A1 | 9/2004 | Beasley |
| 2005/0138157 A1 | 6/2005 | Jung et al. |
| 2008/0104221 A1 | 5/2008 | Zou |
| 2008/0183715 A1 | 7/2008 | Chen et al. |
| 2009/0290513 A1 * | 11/2009 | Swan .................. H04L 41/0213 370/254 |
| 2013/0282886 A1 | 10/2013 | Taylor et al. |
| 2014/0223315 A1 * | 8/2014 | Hagiwara ............... H04L 41/22 715/736 |
| 2016/0094657 A1 | 3/2016 | Vieira et al. |
| 2019/0334993 A1 | 10/2019 | Gkoufas et al. |
| 2021/0248155 A1 | 8/2021 | Badyan et al. |
| 2021/0314212 A1 | 10/2021 | Chandrashekhar et al. |
| 2022/0007437 A1 | 1/2022 | Goenka et al. |
| 2022/0329473 A1 * | 10/2022 | Faircloth ............. H04L 41/0886 |
| 2023/0095514 A1 | 3/2023 | Rafee |
| 2023/0388309 A1 | 11/2023 | Bose et al. |

FOREIGN PATENT DOCUMENTS

| | | |
|---|---|---|
| CN | 110661653 A | 1/2020 |
| EP | 1005196 A1 | 5/2000 |
| EP | 0968596 B1 | 7/2007 |
| EP | 1919129 A1 | 5/2008 |
| EP | 2166703 A1 | 3/2010 |
| EP | 1782246 B1 | 2/2020 |
| EP | 4085344 A1 | 11/2022 |
| JP | H11308302 A | 11/1999 |
| WO | 2010148966 A1 | 12/2010 |
| WO | 2016188499 A1 | 12/2016 |
| WO | 2017084410 A1 | 5/2017 |

\* cited by examiner

NETWORK PROTOCOL-BASED INTERROGATION FOR NETWORK DEVICE CHARACTERIZATION

FIELD OF THE INVENTION

The present disclosure relates to network systems and, more particularly, systems and methods for automatedly documenting networks.

BACKGROUND

Local networks can have a large number of devices that are connected in complicated arrangements. Devices of a local network can include multiple connections to other devices of a local network as well as multiple connections to devices outside of a local network, such as connections to a wide area network (WAN) and/or to a service provider.

Network documentation platforms can be used to document networks and network devices connected to those networks. Network documentation platforms are software platforms that enable users such as network administrators to understand the structure of and devices connected to a network. Users can use network structure and device information to perform various network management tasks and other business functions.

SUMMARY

An example of method of automated network documentation includes receiving a first network address for a first device connected to a local network, sending a first simple network management protocol (SNMP) request to the first network address for the first device, receiving a first SNMP response from the first device in response to the first SNMP request, and extracting first device identity information from the first SNMP request. The first network address is received by a server, the first SNMP request is sent by the server, the first SNMP response is received by the server, and the device identity information is extracted by the server. The server is configured to operate a network documentation platform, the network documentation platform comprising a network documentation database documenting network devices connected to the local network. The method further includes providing, by the server, the first device identity information to the network documentation platform and modifying, by the network documentation platform, the network documentation database to create first device documentation data for the first device based on the first device identity information.

An example of a system for network documentation includes a first network device connected to a local network and a server also connected to the local network and configured to operate a network documentation platform. The first network device configured to receive SNMP commands and to provide SNMP responses and the network documentation platform comprises a network documentation database documenting network devices connected to the local network. The server comprises a processor and at least one memory encoded with instructions that, when executed cause the processor to receive a first network address for the first network device, send a first simple network management protocol (SNMP) request to the first network address, receive a first SNMP response from the first network device in response to the first SNMP request, extract first device identity information for the first network device from the first SNMP response, and cause the network documentation platform to modify the network documentation database to create first device documentation data for the first device based on the first device identity information.

The present summary is provided only by way of example, and not limitation. Other aspects of the present disclosure will be appreciated in view of the entirety of the present disclosure, including the entire text, claims, and accompanying figures.

Figure 1:
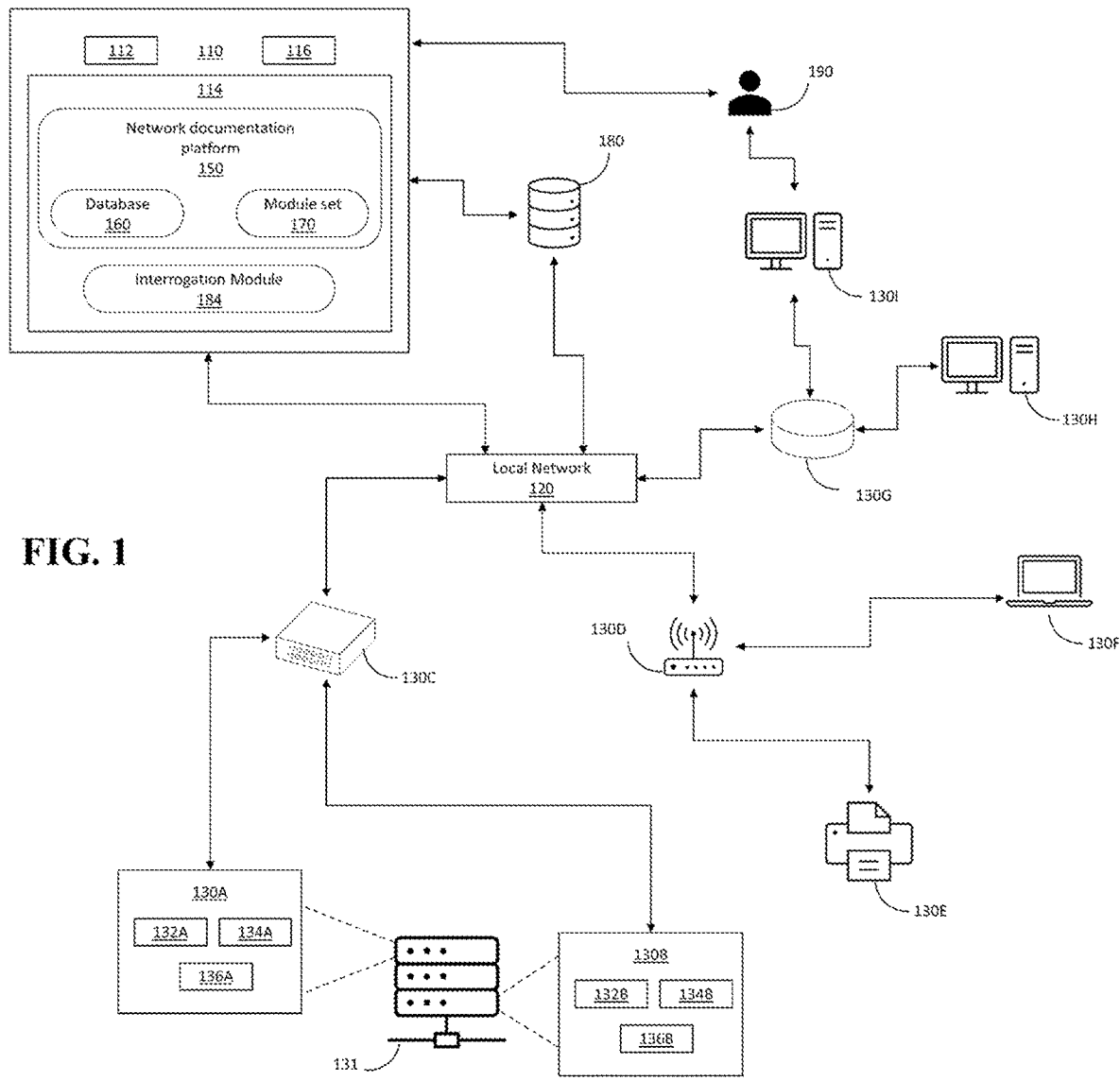
FIG. 1 is a schematic diagram of an example of a system for managing networks and synchronizing network management data.

While the above-identified figures set forth one or more examples of the present disclosure, other examples are also contemplated, as noted in the discussion. In all cases, this disclosure presents the invention by way of representation and not limitation. It should be understood that numerous other modifications and examples can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The present disclosure relates to systems and methods for creating network documentation data for a network documentation platform using simple network management protocol (SNMP). The systems and methods disclosed herein allow for automated creation of network device documentation that is utilizable by a network documentation platform. As will be explained in more detail subsequently, the systems and methods described herein enable utilization of SNMP-derived information that is not used by existing network documentation systems to automatedly create network documentation data, significantly decreasing labor required to create network documentation information. Users can then use the network documentation platform managing the documentation data to perform tasks that are not available using SNMP commands, such as network mapping, network visualization, etc.

Existing network documentation platforms and software systems require users to manually create documentation for existing devices or to create and maintain their own platform-specific libraries that store device information (such as hardware configurations, software configurations, etc.). As such, network documentation using existing platforms and systems is a laborious task and generally requires a human operator to be physically on-premises to document network devices for a network. As will be explained in more detail subsequently, the present disclosure describes systems and methods that enable the automated creation of network documentation data using SNMP. In particular, the systems and methods disclosed herein enable interrogation of devices using SNMP to obtain device information and the transformation of SNMP message data into network documentation data usable by a network documentation platform. The systems and methods disclosed herein advantageously do not require modification of existing network documentation platforms and, as such, the systems and methods described herein are able to provide SNMP-derived documentation information for a wide variety of network documentation platforms.

FIG. 1 is a schematic depiction of system 10, which is an illustrative system for generating network documentation data for a network documentation platform. System 10 includes server 110, local network 120, network devices 130A-I, and management information base (MIB) 180. Server 110 includes processor 112, memory 114, and user interface 116. Network device 130A includes processor 132A, memory 134B, and user interface 136A, and network device 130B includes processor 132B, memory 134B, and user interface 136B. Network devices 130A, 130B are located in server rack 131. Server 110 operates network documentation platform 150, which includes database 160 and module set 170. Memory 114 of server 110 stores elements of network documentation platform 150, including database 160 and module set 170. Memory 114 also stores interrogation module 184, which includes one or more programs executable by processor 112. FIG. 1 also depicts user 190. As will be explained subsequently, system 10 allows for automated creation of network documentation data managed by network documentation platform 150.

Server 110 is a server connected to local network 120. Although server 110 is generally referred to herein as a server, server 110 can be any suitable computing device for performing the functions of server 110 detailed herein. Server 110 operates network documentation platform 150 and is further configured to automatedly generate network documentation data describing the network devices (e.g., devices 130A-I) of local network 120.

Processor 112 can execute software, applications, and/or programs stored on memory 114. Examples of processor 112 can include one or more of a processor, a microprocessor, a controller, a digital signal processor (DSP), an application specific integrated circuit (ASIC), a field-programmable gate array (FPGA), or other equivalent discrete or integrated logic circuitry. Processor 112 can be entirely or partially mounted on one or more circuit boards.

Memory 114 is configured to store information and, in some examples, can be described as a computer-readable storage medium. Memory 114, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 114 is a temporary memory. As used herein, a temporary memory refers to a memory having a primary purpose that is not long-term storage. Memory 114, in some examples, is described as volatile memory. As used herein, a volatile memory refers to a memory that that the memory does not maintain stored contents when power to the memory 114 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on server 110 to temporarily store information during program execution.

Memory 114, in some examples, also includes one or more computer-readable storage media. Memory 114 can be configured to store larger amounts of information than volatile memory. Memory 114 can further be configured for long-term storage of information. In some examples, memory 114 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 116 is an input and/or output device and/or software interface, and enables an operator, such as user 190, to control operation of and/or interact with software elements of server 110. For example, user interface 116 can be configured to receive inputs from an operator and/or provide outputs. User interface 116 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Local network 120 is a network that connects server 110, devices 130A-I, and MIB 180. Local network 120 includes devices 130A-I as well as other network infrastructure components for connection local devices 130A-I to server 110 and/or MIB 180. Local network 120 can include, for example, one or more switches, routers, modems, gateways, access points, etc. for facilitating communication of server 110, devices 130A-I, and MIB 180. Local network 120 can be, for example, a local area network, a campus area network, a metropolitan area network, or another suitable network type. Generally, local network 120 connects network devices (e.g., devices 130A-I) that are connected by smaller geographic distances than the devices of a WAN (e.g., the Internet).

Devices 130A-I are network devices of local network 120. Devices 130A-I include networking capability and can be connected via wireless and/or wired connections to other components of local network 120. Local devices 130A-B are servers in server rack 131 and include processors 132A-B, memories 134A-B, and user interfaces 136A-B. Processors 132A-B, memories 134A-B, and user interfaces 136A-B are substantially similar to processor 112, memory 114, and user interface 116, respectively, and the discussion herein of processor 112, memory 114, and user interface 116 is applicable to processors 132A-B, memories 134A-B, and user interfaces 136A-B, respectively. Local device 130C is a switch and is directly connected to devices 130A-B as well as another network device of local network 120. Device 130D is a wireless router, device 130E is a wireless printer, and device 130F is a laptop computer including hardware for wireless networking. Device 130D is connected to devices 130E-F and also to another network device of local network 120. Device 130G is a wired router and is connected to devices 130H-I as well as another network device of network 120. Devices 130H-I are desktop computers. Devices 130C-I can also include processors, memories, and user interfaces that are substantially similar to processor 112, memory 114, and user interface 116. For example, devices 130F, 130H, 130I can each include a processor, at least one memory, and a user interface. Devices 130A-I can also be interconnected via cabling and/or other components of local network 120 that are not depicted in FIG. 1.

Figure 2:
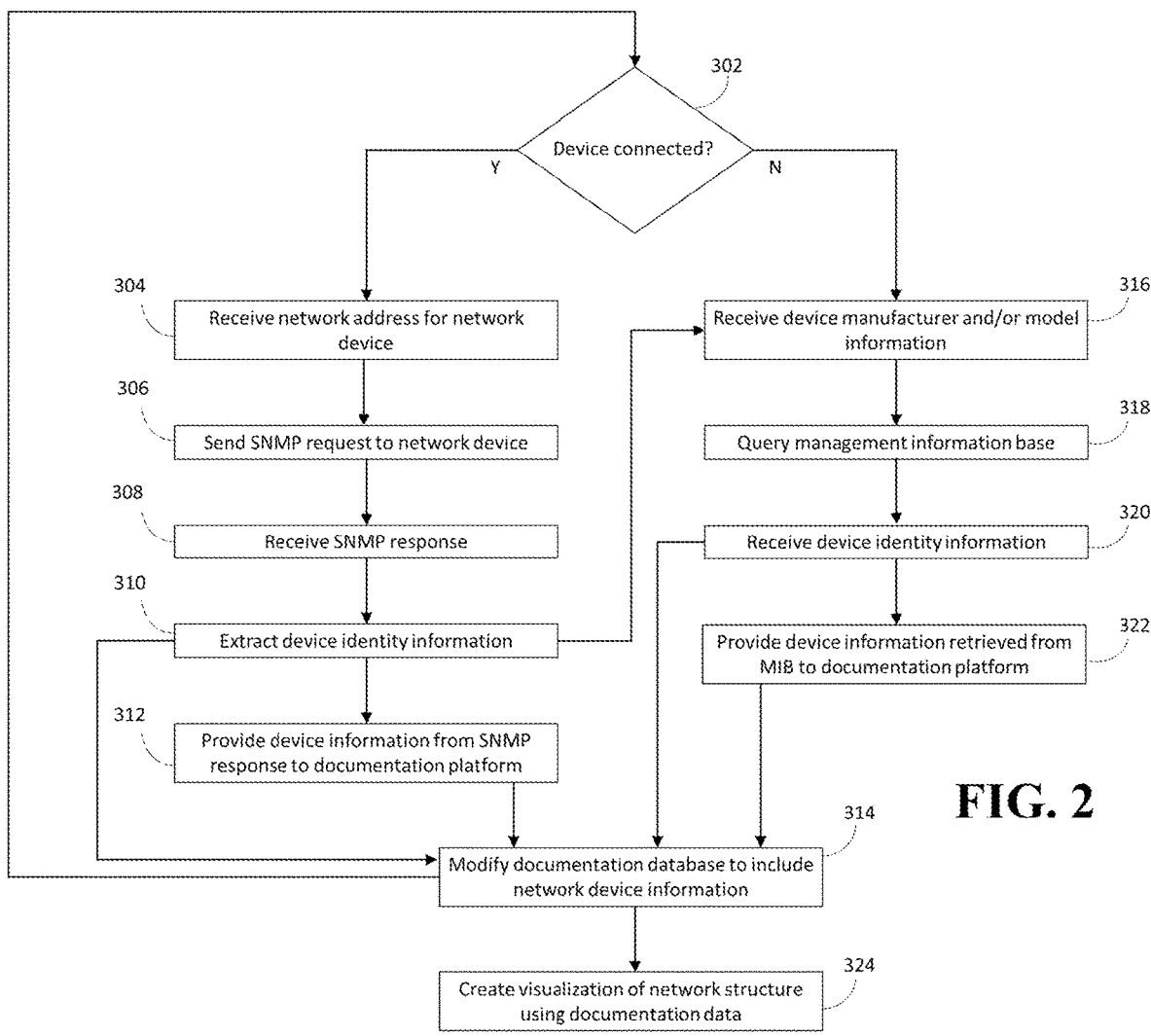
FIG. 2 is a schematic diagram of another example of a system for managing networks and synchronizing network management data.

The specific identities of devices 130A-I depicted in FIG. 1 and described herein are included by way of example and, in other examples, local network 120 can include any suitable devices in any suitable structure, arrangement, configuration, etc. Server 110 and the advantages conferred by method 300 (FIG. 2), as discussed subsequently, can be implemented in any suitable local network having any suitable network devices. Further, as described previously, local network 120 includes additional network devices and infrastructure that is not depicted in FIG. 1. Network devices 130A-I are a subset of the network devices of local network 120 and are depicted herein as illustrative examples of network devices of a local network and the functionality of server 110 (and, relatedly of method 300; FIG. 2) is not dependent on the structure and arrangement of network devices 130A-I depicted in FIG. 1.

Server 110 operates network documentation platform 150, which is a platform for documenting network devices of local network 120. Network documentation platform 150 can store device identity information for each device, including device manufacturer information, device model information, device hardware configurations, device network address information, device connectivity information, device software configurations, and/or device operational status, among other options. Device connectivity information stored by network documentation platform 150 can include, for example, local connections between devices of local network 120 (e.g., a connection between one of devices 130A-I and another of devices 130A-I) and/or connections between devices of local network 120 and external service providers (e.g., a connection between one of devices 130A-I and an internet service provider). Where network documentation platform 150 maintains data describing the local connectivity of network devices of local network 120, network documentation platform 150 can, for example, store information describing the specific physical ports of network devices that are used for wired connections. In at least some examples, network documentation platform 150 is a data center infrastructure management (DCIM) platform. As a specific example, network documentation platform 150 can be an instance of NetBox.

Network documentation platform 150 does not include functionality to discover and automatedly document the devices of local network 120. Rather, as will be explained in more detail subsequently, other programs of server 120 are able to characterize devices currently connected to local network 120 as well as devices that are planned to be connected to local network 120 and to provide that information to network documentation platform 150. Network documentation platform 150 can then modify network documentation database 160 to create network documentation data for the characterized device(s).

In addition to creating and managing network documentation data, network documentation platform 150 can perform various tasks using network documentation data stored to network documentation database 160, such as inventorying tasks and/or other network administration and management tasks, among other options. In at least some examples, network documentation platform 150 platform can also create visualizations of local network 120, including visualizations that depict wired and/or wireless connections between network devices of local network 120 (e.g., devices 130A-I).

Network documentation platform 150 maintains data describing the network objects (e.g., devices 130A-I) of local network 120 in network documentation database 160. The data stored by network documentation database 160 can describe, for example: network hierarchies (including hierarchies of network regions, sites, and/or locations) of local network 120; identities of local devices 130A-I; physical locations of local devices 130A-I (e.g., position within a server rack, location of the server rack, etc.); local wired and/or wireless connections of local devices 130A-I (e.g., cabling paths, physical port capacity and utilization, etc.); external wired and/or wireless connections of local devices 130A-I (e.g., internet service provider connections, connections to external web services, connections to other networks, etc.); virtual machine identifiers, addresses, etc.; power distribution among local devices 130A-I; hardware configurations of local devices 130A-I; internet protocol (IP) addresses of local devices 130A-I and IP address ranges available on local network 130; virtual route forwarding (VRF) configurations of local network 120; and/or any other suitable information for describing the devices of local network 120 (e.g., local devices 130A-I). Using the devices 130A-I depicted in FIG. 1 as an illustrative example, network documentation data for devices 130A, 130B can describe the position of each device in server rack 131; network documentation for devices 130C, 130D, 130G can describe the other of network devices 130A-I connected to those devices; network documentation data for devices 130E, 130F, 130H, 130I can describe connected devices, including any connections to devices 130C, 130D, 130C; network documentation for devices 130A-I can include specific hardware components (e.g., physical ports, power supplies, etc.) of devices 130A-I; etc. Network documentation database 160 can be any suitable queryable database. In some examples, network documentation database 160 is a structured database, such as a relational database.

Network documentation platform 150 also includes module set 170. Module set 170 includes one or more program modules executable by network documentation platform 150 for enabling functionality of network documentation platform 150. Module set 170 can enable functionality such as network monitoring and data collection, billing, sales, inventorying, business operations, and/or troubleshooting, among other options.

MIB 180 is a database that stores SNMP data for the devices local network 120. MIB 180 is used by an SNMP manager (not depicted in FIG. 1) of local network 120 to perform SNMP-based network management tasks. MIB 180 stores information describing the network objects of local network 120 (e.g., devices 130A-I) and further stores information describing putative network devices (i.e., devices not yet connected to local network 120), such as device manufacturer information, device model information, hardware and/or software configurations information, etc. MIB 180 is generally a hierarchical database that is primarily grouped or structured according to device manufacturer (i.e., such that device manufacturer is an upper level and/or the highest level of the hierarchy). However, in other examples, MIB 180 can be another suitable type of database, including another suitable type of non-relational database. MIB 180 can, in some examples, be configured to store device information for all devices manufactured by a particular manufacturer, including device information for specific devices not currently connected to local network 120.

Interrogation module 184 includes one or more programs that enable server 110 to query the devices of local network 120 (e.g., devices 130A-I) using SNMP to determine device-specific information. Interrogation module 184 enables server 110 to send and receive SNMP-based messages to network devices of local network 120 using the network infrastructure (i.e., cables, devices, etc.) of local network 120. The program(s) of interrogation module 184 can extract device information from the received SNMP response and provide that extracted information to network documentation platform 150 in a format that is usable by network documentation platform 150 to create network documentation data in network documentation database 160. Additionally and/or alternatively, interrogation module 184 can create network documentation data in network documentation database 160 (i.e., by directly modifying data of network documentation database 160) according to the device information extracted from SNMP responses to network devices (e.g., devices 130A-I).

Interrogation module 184 can also issue SNMP commands to MIB 180 to obtain information from MIB 180 that describes network devices not currently connected to local network 120. MIB 180 can store information for devices connected to local network 120 and, further, can store information for devices not currently connected to local network 120. As new devices (i.e., those not already configured and connected to local network 120) are not configured to connect to local network 120 and, further, are not configured with SNMP credentials, those devices must be fully configured (i.e., configured to join network 120, configured to send and receive SNMP messages, configured with SNMP access credentials, etc.), server 110 can at least partially characterize a new device using data stored to MIB 180. The program(s) of interrogation module 184 can query MIB 180 using device manufacturer information and/or device model information to characterize the new device and create data in network documentation database 160 for the new device. The program(s) of interrogation module 184 are able to provide information received from MIB 180 to network documentation platform 150 in a format that is recognizable and usable by network documentation platform 150 to create network documentation data. Additionally and/or alternatively, interrogation module 184 can create network documentation data in network documentation database 160 (i.e., by directly modifying data of network documentation database 160) according to information received from MIB 180.

In examples where some information about a device is known, such as device manufacturer information, interrogation module 184 can also query MIB 180 to retrieve additional device information, such as device hardware configuration information, and create network documentation data for network documentation platform 150. In some examples, interrogation module 184 can enable server 110 to interrogate a network device of local network 120 to obtain initial information about the network device, and can use the information obtained through device interrogation to then query MIB 180 to obtain additional device information. Interrogation module 184 can be configured to automatically and automatedly query MIB 180 to obtain additional device information in examples where an SNMP query of a network device does not provide sufficient information to create network documentation data for network documentation platform 150.

User 190 can cause server 110 to execute the program(s) of interrogation module 184 and/or server 110 can be configured to automatically execute the program(s) of interrogation module 184. Server 110 can, for example, be configured to execute the program(s) of interrogation module 184 in pre-determined time intervals and/or in response to a network signal indicating that a new device has been connected to local network 120. Additionally and/or alternatively, one of devices 130A-I operable by user 190 (e.g., device 130I) can include interrogation module 184 as well as programs for providing data collected by interrogation module 184 to network documentation platform 150. Including interrogation module 184 on one of devices 130A-I does not change the functionality of interrogation module 184 described herein. In examples where a device of devices 130A-I includes interrogation module 184, server 110 can optionally omit interrogation module 184, i.e. such that an analogous interrogation module disposed on another device performs the functions described above with respect to interrogation module 184.

Advantageously, interrogation module 184 enables server 110 to automatedly create network documentation data in network documentation database 160 for use by network documentation platform 150. In existing systems including a network documentation platform, users (e.g., user 190) are required to manually create the network documentation data used by the network documentation platform. Existing systems are not able to perform automated discovery and/or data creation tasks enabled by the program(s) of interrogation module 184. As such, server 110 and, in particular, interrogation module 184 significantly decreases the time and human labor required to document networks, and in so doing also reduces the cost associated with network documentation. Notably, the program(s) of interrogation module 184 leverage SNMP information to generate network documentation information. As such, server 110 and interrogation module 184 do not require specialized network equipment to operate and, rather, are able to operate using pre-existing network infrastructure. Notably, the use of existing network infrastructure enables automated documentation of network devices in physical locations that are difficult to access and/or of network devices for which the physical location is not known or otherwise documented. Further, network devices are only required to have SNMP functionality to be discovered and documented by server 110 and interrogation module 184. In examples where network devices are configured by a manufacturer with SNMP functionality, those devices do not require any additional configuration to be automatedly discovered and documented using interrogation module 184. Further, interrogation module 184 can function with any suitable network documentation platform and, accordingly, server 110 does not require a specialized network documentation platform to leverage SNMP information for discovery and documentation, as the programs of interrogation module 184 are able to convert SNMP responses from network devices and/or a MIB into network documentation data and/or into data usable by a network documentation platform.

The data created using interrogation module 184 can be analyzed, manipulated, etc. using the functionality of network management platform 150 (e.g., via module set 170). Network management platform 150 includes additional functionality that is not available via SNMP commands, such as billing functionality, network visualization, network mapping, inventorying, etc. In this manner, server 110 uses the program(s) of interrogation module 184 to create network documentation data using SNMP commands not available to network documentation platform 150 and, further, uses the functions of network documentation platform 150 to analyze local network 120 (i.e., using the network documentation data) and perform other documentation tasks that are not possible using SNMP commands.

FIG. 2 is a flow diagram of method 300, which is a method of automatedly generating network documentation data for a network documentation platform. Method 300 includes steps 302-324 of determining whether a device is currently connected to a local network (step 302), receiving a network address for the network device (step 304), sending an SNMP request to the network device (step 306), receiving an SNMP response from the network device (step 308), extracting device information from the SNMP response (step 310), providing device information extracted from the SNMP response to the network documentation platform (step 312), modifying the documentation database to include information for the network device (step 314), receiving device manufacturer information for the network device (step 316), querying a MIB (step 318), receiving device identity information from the MIB (step 320), and providing device information retrieved from the MIB to the documentation platform (step 322), and creating a visualization of the network structure using documentation data (step 324). Method 300 is performable by server 110 of system 10 and is described herein with reference to system 10 (FIG. 1), but method 300 can be implemented in any suitable system to enable automated generation of network documentation data. Advantageously, method 300 significantly reduces time and human labor required to generate network documentation data, thereby also reducing cost associated with network documentation.

Step 302 is a branch point in method 300 and causes method 300 to proceed to step 304 or step 316 based on network device connectivity information. If the network device to be documented is desired is currently connected to the local network and is configured for SNMP, method 300 proceeds to step 304. Alternatively, if the network device for which documentation data is desired is a new device that is not currently connected to the local network, method 300 proceeds to step 316. Step 302 can be performed using, for example, user input at user interface 116 of server 110. Server 110 can prompt a user to indicate whether new documentation data will be for a new or existing device of local network 120. Server 110 can then proceed to step 304 or step 316 based on user input at user interface 116 in response to the prompt. Additionally and/or alternatively, in examples where server 110 is configured to automatically scan local network 120 to document network devices thereof, server 110 can be configured to perform step 302 automatically and/or to omit step 302, such that method 300 begins at step 304.

Step 310, step 320, and 314 are additional branch points of method 300. Method 300 can proceed alternatively to step 312, step 314, or step 316 from step 310. That is, the three arrows illustrating paths of method 300 from step 310 depict alternate,=and exclusive paths from step 310. In a given iteration of method 300, only one path from step 310 is selected. Similarly, method 300 can proceed alternatively to step 314 or step 322 from step 320, such that the two arrows illustrating paths of method 300 depict alternate and exclusive paths from step 320. In a given iteration of method 300, only one path from step 320 is selected. All potential paths of method 300 from step 310 and step 320 are depicted in FIG. 3 for illustrative clarity. Method 300 can proceed to one or both of step 302 and 324 from step 314. In at least some examples, method 300 proceeds to only one of step 302 and step 324 from step 314. In yet other examples, method 300 can proceed to both of step 302 and step 324 from step 314.

In step 304, server 110 receives network address information for the network device for which documentation data is to be generated. The network address information is an address suitable for sending an SNMP request (e.g., an SNMP message) to the network device from server 110. The network address received in step 304 can be, for example, an internet protocol (IP) address for the device. In step 304, server 110 can, for example, receive the network address by retrieving the network address from an existing repository, table, database, etc. of network addresses for the local network. Additionally and/or alternatively, server 110 can receive the network address by inspecting local network 110 to discover the network device and/or the network address for the network device.

In step 306, server 110 sends an SNMP request to the network device. The SNMP request includes one or more SNMP commands for commanding the network device to generate an SNMP response including information describing the device, such as device manufacturer information, device model information, hardware and/or software configurations information, etc. The SNMP request in step 306 is sent to the network address received in step 304.

In step 308, server 110 receives an SNMP response from the network device. The network device receives the SNMP request sent in step 306 and generates an SNMP message in response to the command(s) included in the SNMP request. The response received in step 308 includes requested device information describing the network device. In some examples, the SNMP request can include an access credential for the SNMP-enabled network device. In these examples, the SNMP device can compare the transmitted access credential to a credential stored by the device to authenticate that server 110 can receive the requested information before transmitting the requested information. The access credential can be, for example, an SNMP community string, among other options.

In step 310, server 110 extracts device identity information from the SNMP response received in step 308. As described previously, the identity information provided to the network documentation platform 150 is sufficient to define the device within network documentation platform 150. For example, the device identity information can define the device manufacturer, the device model, device hardware, device software, physical connections of the network device, etc.

In step 312, server 110 provides the extracted device information to network documentation platform 150 in a format that is usable by the network documentation platform to create documentation data for the network device. Step 312 is optional and is included in examples where the program(s) of interrogation module 184 does not directly modify the data of network documentation database 160.

In step 314, the data of network documentation database 160 is modified to include data for the network device characterized in steps 304-310. Network documentation database 160 can be modified by network documentation platform 150 in examples of method 300 including step 312 and/or can be modified directly by the program(s) of interrogation module 184 in examples of method 300 not including step 312.

Steps 316-320 are used to create device documentation data based on MIB data rather than SNMP responses from the characterized device. Steps 316-320 can be performed in addition to steps 304-310 for devices that are not already connected to the network and configured for SNMP, and can also be performed for devices that are not connected to the network (i.e., as evaluated in step 302).

In step 316, server 110 receives information describing the manufacturer and/or model of the network device. The device manufacturer information can be derived from, for example, the device identity information obtained in step 310. Additionally and/or alternatively, the device manufacturer information can be obtained from user input at user interface 116 of server 110. Server 110 can, for example, prompt a user to provide device manufacturer information for a device that is not yet connected to local network 120. In some examples, the information received in step 316 can also include device model information. The device model information can also be obtained from, for example, identity information extracted in step 310 and/or from user input at user interface 116.

In step 318, server 110 queries MIB 180 using the information received in step 316. Server 110 queries MIB 180 to obtain device identity information that can be used to create documentation data in network documentation database 160. More specifically, server 110 can query MIB with the limited information obtained in step 316 to retrieve more detailed information that is suitable for creating documentation data for the device in documentation database 160. As described previously, in examples where MIB 180 is a hierarchical database, device manufacturer be an upper and/or the highest level of the database hierarchy. MIB 180 can be queried with device manufacturer information for a device to return all information stored in lower hierarchical layers for the queried manufacturer. The returned information can be examined to extract device-agnostic information that can be used to create device documentation data in subsequent steps of method 300. Further, MIB 180 can also be queried with device model information to return all information stored in lower hierarchical layers for the queried device, which can then be examined to create device documentation data in subsequent steps of method 300.

In step 320, server 110 receives device identity information in response to the query of MIB 180 made in step 318. The information returned to server 110 in step 320 describes the device in more detail than the information used to query MIB 180 in step 318.

In step 322, server 110 provides the device information received in step 320 to network documentation platform 150 in a format that is usable by the network documentation platform to create documentation data for the network device. Step 322 is optional and is included in examples where the program(s) of interrogation module 174 does not directly modify the data of network documentation database 160.

After step 320 and/or 322, method 300 proceeds to step 314. Step 314 is performed in substantially the same manner as described previously. Method 300 proceeds to step 314 after step 320 in examples where the program(s) of interrogation module 174 directly modifies documentation data of documentation database 110. Method 300 proceeds to step 322 following step 320 and to step 314 from step 322 in examples where the prog (s) of interrogation module 174 does not directly modify the data of network documentation database 160.

In examples where the device characterized using steps 316-320 is not yet connected to the network, the device can also be connected to the network as part of step 314 of method 300. The device can be connected to the network while the documentation database is modified in step 314 (i.e., simultaneously or substantially simultaneously with the modification) and/or can be connected after the documentation database is modified in step 314.

In step 324, network documentation platform 150 creates a visualization of the local network 120 and connections between network devices thereof. The visualization can, for example, be a network map illustrating the connections between devices of local network 120. Step 324 is optional and can be performed where visually-understanding the structure of local network 120 is desirable. The visualization created in step 324 can be output via, for example, user interface 116 of server 110 and/or a user interface of a network device of local network 120 (e.g., one of network devices 130A-I).

Steps 302-314 can be repeated for each device of a particular network (e.g., for all devices of local network 120) to create documentation data for each device of the network. Steps 302-314 can also be repeated each time a new device is added to the network (i.e., by repeating steps 302, 316, 318, 320, 322, 314). Method 300 can be performed automatically by server 110 when server 110 detects that a new device has been added to local network 120. Further, all steps of method 300 can be performed in an automated manner, significantly reducing human labor required to document local network 120. As discussed previously, while method 300 has been described herein generally with respect to the devices of system 10 (FIG. 1), method 300 can be implemented to automatedly document the network devices of any suitable network.

Advantageously, method 300 allows for the automated documentation of network devices of a local network. Method 300 significantly reduces the time and labor required to document the existing network devices of network by using SNMP-based functionality to obtain device attributes and other descriptive information that can be used to create documentation data for a network documentation platform. Steps 304-310 of method 300 collect data suitable for device documentation by interrogating existing network devices via SNMP. Existing network devices having existing SNMP credentials and that are already connected to a local network are suitable for SNMP interrogation using steps 304-310. Advantageously, this allows for the automated creation of documentation data for existing network devices without requiring a human operator to manually populate or create documentation data for those devices. In some examples, method 300 can allow for documentation of network devices without requiring a human operator to obtain physical access to each network device to create network documentation, thereby allowing documentation of network devices that are physically difficult to access and/or those having an unknown physical location. Method 300 also leverages SNMP for new devices (i.e., those devices not already connected to a network and for which SNMP credentials do not yet exist) by querying an SNMP MIB to obtain device information for the new device. Advantageously, this allows for SNMP information to be used to characterize a device for a network documentation platform without requiring that the new device already be configured for SNMP communication and connected to the local network. Method 300 further leverages MIB information to supplement data received from device interrogation. The SNMP-derived information can be visualized in step 324 and can be used by a network documentation platform for other tasks, such as billing, inventorying, etc.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of automated network documentation, the method comprising:
receiving, by a server in electronic communication with a local network, a first network address for a first device connected to the local network, the server configured to operate a network documentation platform, the network documentation platform comprising a network documentation database documenting network devices connected to the local network;

sending, by the server, a first simple network management protocol (SNMP) request to the first network address for the first device;

receiving, by the server, a first SNMP response from the first device in response to the first SNMP request;

extracting, by the server, first device identity information for the first device from the first SNMP response, wherein the first device identity information comprises at least one of a device manufacturer and a device model;

providing, by the server, the first device identity information to the network documentation platform; and querying, by the server, a management information base with at least one of the device manufacturer and the device model to retrieve at least one of the hardware configuration and the software configuration of the first device; and providing, to the network documentation platform, the at least one of the hardware configuration and the software configuration;

modifying, by the network documentation platform, the network documentation database to create first device documentation data for the first device based on the first device identity information and at least one of the hardware configuration and the software configuration;

wherein the first device documentation data comprises at least one of a device name, a device class, a device manufacturer, a device model, a hardware configuration, one or more local connections between the first device and a second device of the local network, an operational status of the one or more local connections, one or more provider connections between the first device and a network provider, a device hardware configuration, a device software configuration, a physical location of the first device, and a protocol service of the first device.

2. The method of claim 1, wherein the first device documentation data comprises at least one of a device name, a device class, a device manufacturer, a device model, a hardware configuration, one or more local connections between the first device and a second device of the local network, an operational status of the one or more local connections, one or more provider connections between the first device and a network provider, a device hardware configuration, a device software configuration, a physical location of the first device, and a protocol service of the first device.

3. The method of claim 2, wherein the first device identity information comprises at least one the device name, the device manufacturer, the device model, the hardware configuration, the one or more local connections, the operational status of the one or more local connections, the one or more provider connections, the device hardware configuration, the device software configuration, the physical location of the first device, and the protocol service of the first device.

4. The method of claim 1, wherein the network documentation database is a relational database and the management information base is a non-relational database.

5. The method of claim 1, and further comprising:
receiving, by the server, second device manufacturer information for a second device not connected to the local area network;

querying, by the server, a manufacturer information base with the second device manufacturer information to retrieve second device identity information for the second device;

providing, by the server, the second device identity information to the network documentation platform; and modifying, by the network documentation platform, the network documentation database to create second device documentation data for the second device based on the second device identity information.

6. The method of claim 4, and further comprising connecting the second device to the local network after modifying the network documentation database to create the second device documentation data.

7. The method of claim 1, and wherein receiving the first network address comprises discovering, by the server, the first network address by inspecting the local network.

8. The method of claim 1, and further comprising:
receiving, by the server, a second network address for a second device connected to the local network;
sending, by the server, a second SNMP request to the second network address for the second device;
receiving, by the server, a second SNMP response from the second device;
extracting, by the server, second device identity information for the second device from the SNMP response;
providing, by the server, the second device identity information to the network documentation platform; and
modifying, by the network documentation platform, the network documentation database to create second device documentation data for the second device in the network documentation database based on the second device identity information.

9. The method of claim 1, and further comprising retrieving a first access credential for the first device, wherein the first SNMP request comprises the first access credential.

10. The method of claim 9, and further comprising determining, by the first device, to send the first SNMP response by comparing the first access credential with a first SNMP credential stored by the device.

11. The method of claim 1, and further comprising creating, by the server, a visualization of the local network based on the network documentation database.

12. The method of claim 1, wherein the first device documentation data includes device connectivity information describing network connections between the first device and one or more other devices of the local network and further comprising, for each of the one or more other devices, updating device documentation data in the network documentation database of the local network to include a connection to the first device.

13. A system for network documentation, the system comprising:
a first network device connected to a local network, the first network device configured to receive SNMP commands and to provide SNMP responses;
a management information base (MIB) organizing device identity information; and
a server connected the local network and configured to operate a network documentation platform, wherein:
the network documentation platform comprises a network documentation database documenting network devices connected to the local network, and
the server comprises:
a processor; and
at least one memory encoded with instructions that, when executed, cause the processor to:

receive a first network address for the first network device; send a first simple network management protocol (SNMP) request to the first network address;

receive a first SNMP response from the first network device in response to the first SNMP request;

extract first device identity information for the first network device from the first SNMP response;

cause the network documentation platform to modify the network documentation database to create first device documentation data for the first device based on the first device identity information;

receive second device manufacturer information for a second device not connected to the local area network;

query the manufacturer information base with the second device manufacturer information to retrieve second device identity information for the second device;

cause the network documentation platform to modify the network documentation database to create second device documentation data for the second device based on the second device identity information.

14. The system of claim 13, wherein the network documentation database is a relational database and the manufacturer information base is a non-relational database.

15. The system of claim 13, wherein the device documentation data includes device connectivity information describing network connections between the first device and one or more other devices of the local network, and wherein the instructions, when executed, further cause the processor to cause the network documentation platform to update, for each of the one or more other devices of the local network, device information stored in the network documentation database to include a connection to the first device.

16. The system of claim 13, wherein the first device identity information comprises at least one the device name, the device manufacturer, the device model, the hardware configuration, the one or more local connections, the operational status of the one or more local connections, the one or more provider connections, the device hardware configuration, the device software configuration, the physical location of the first device, and the protocol service of the first device.

17. The system of claim 13, wherein the instructions, when executed, cause the processor to cause the network documentation platform to create a visualization of the local network based on the network documentation database after modifying the network documentation database to create the first device documentation data.

18. The system of claim 13, wherein the instructions, when executed, cause the processor to receive the first network address by inspecting the local network to discover the first network address.

19. A method of automated network documentation, the method comprising:

receiving, by a server in electronic communication with a local network, a first network address for a first device connected to the local network, the server configured to operate a network documentation platform, the network documentation platform comprising a network documentation database documenting network devices connected to the local network;

sending, by the server, a first simple network management protocol (SNMP) request to the first network address for the first device;

receiving, by the server, a first SNMP response from the first device in response to the first SNMP request;

extracting, by the server, first device identity information for the first device from the first SNMP response;

providing, by the server, the first device identity information to the network documentation platform;

modifying, by the network documentation platform, the network documentation database to create first device documentation data for the first device based on the first device identity information;

receiving, by the server, second device manufacturer information for a second device not connected to the local area network;

querying, by the server, a manufacturer information base with the second device manufacturer information to retrieve second device identity information for the second device;

providing, by the server, the second device identity information to the network documentation platform; and modifying, by the network documentation platform, the network documentation database to create second device documentation data for the second device based on the second device identity information.

* * * * *